United States Patent [19]

Davis et al.

[11] 3,723,404

[45] Mar. 27, 1973

[54] CHLORONITROSYLATED POLYMERS AND A PROCESS FOR THE PREPARATION THEREOF

[75] Inventors: Pauls Davis, Gibraltar; Herwart C. Vogt, Grosse Ile, both of Mich.

[73] Assignee: Basf Wyandotte Corporation, Wyandotte, Mich.

[22] Filed: Jan. 21, 1970

[21] Appl. No.: 4,756

[52] U.S. Cl. ........260/94.9 GB, 260/79.3, 260/85.1, 260/88.2 S, 260/92.1, 260/92.8 AC, 260/93.5 A, 260/93.7, 260/94.7 HA, 260/94.7 N, 260/94.8, 260/94.9 H, 260/96 H
[51] Int. Cl. ....C08f 27/02, C08f 27/08, C08f 27/00, C08f 27/03, C08d 5/04
[58] Field of Search .260/94.9 H, 93.7, 94.7 H, 96 H, 260/92.8 AC, 85.1

[56] References Cited

UNITED STATES PATENTS 2,964,517  12/1960  Eck et al. ..........................260/94.9

OTHER PUBLICATIONS

Copending Ser. No. 4754 (same applicants) filed same day as instant case 1-21-1970.

*Primary Examiner*—Joseph L. Schofer
*Assistant Examiner*—William F. Hamrock
*Attorney*—Joseph D. Michaels, Bernhard R. Swick, Robert E. Dunn and Robert M. Phipps

[57] ABSTRACT

Polymers containing chlorine and nitrogen atoms are prepared by the reaction of a hydrocarbon polymer with nitrosyl chloride or chlorine and nitric oxide. The resulting polymers may be cross-linked with heat to provide polymers having improved physical properties.

10 Claims, No Drawings

CHLORONITROSYLATED POLYMERS AND A PROCESS FOR THE PREPARATION THEREOF

The present invention relates to novel hydrocarbon polymers containing polar groups and to the preparation thereof. More particularly, the invention relates to modified hydrocarbon polymers containing both chlorine and nitrogen atoms.

Many different methods have been proposed for modifying thermoplastic and thermosetting polymers to improve their properties or to increase their field of utility. This is often desirable in order to improve such properties as adhesiveness, dyeability, printability, dispersibility, antistatic characteristics and compatibility with other materials including other polymers. Such methods have included, for example, irradiation, oxidation, sulfonation, chlorination, fluorination, and reduction.

It is an object of the present invention to provide hydrocarbon polymers containing polar groups. Another object of the present invention is to provide hydrocarbon polymers containing both chlorine and nitrogen atoms. A further object of the present invention is to provide modified hydrocarbon polymers which may be cross-linked by heat into polymers having modified physical properties. These and other objects of the present invention will be apparent from the specification and examples which follow.

The above objects of the present invention are accomplished by dissolving a hydrocarbon polymer in an inert reaction medium and reacting said polymer with nitrosyl chloride or chlorine and nitric oxide in the presence of a catalyst. The resulting chloronitrosylated polymer may be cross-linked upon treatment with heat to yield a polymer having modified physical properties. The polymers of the present invention have a chlorine content of from 0.05 percent to 73 percent by weight and a nitrogen content of from 0.1 percent to 5 percent by weight.

Hydrocarbon polymers which may be chloronitrosylated according to the present invention generally have a molecular weight from about 1,000 to 500,000, preferably from about 10,000 to 150,000. The polymers may be completely saturated or they may contain residual, reactive ethylenic unsaturation or functional groups such as halogen atoms or carbonyl, carboxyl and hydroxyl groups. Representative hydrocarbon polymers include polyolefins such as polyethylene, polypropylene, polybutylene, the higher polyalkylenes, copolymers prepared from mixtures of olefins such as poly(ethylene-propylene), chlorinated polyolefins such as chlorinated polyethylene, polystyrene, poly(methylstyrene), poly($\alpha$-methylstyrene), polybutadiene, polyisobutylene, chloroprene, butyl rubber, poly(styrene-butadiene), polysulfone and polyvinyl and polyvinylidene halides such as polyvinylchloride, polyvinylidenechlorine, polyvinylfluoride and polyvinylidenefluoride.

As mentioned above, the process of the present invention comprises reacting a hydrocarbon polymer with nitrosyl chloride or chlorine and nitric oxide in the presence of a catalyst such as light, heat or a free-radical initiator. Representative free-radical initiators which may be employed in the preparation of the polymers of the present invention include any standard well-known, free-radical initiator, preferably peroxides such as hydrogen peroxide, t-butyl peroxide, di-t-butyl peroxide, benzoyl peroxide, tertiary butyl hydroperoxide and dicumyl peroxide, and azo compounds such as azobis(isobutyronitrile). Other peroxide initiators which may be employed in the present invention include cumene hydroperoxide, dichlorobenzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate, dibenzaldiperoxide, 2,2-(tertiary butylperoxy)butane, bis(parabromobenzoyl)peroxide, bis(parachlorobenzoyl)peroxide, bis(succinyl)-peroxide, and bis(chloroacetyl)peroxide. Reference is made to a book entitled *Radical Polymerization* by J. C. Bevington, (Academic Press, 1961), pages 5–28, for a detailed discussion of well-known free-radical initiators which may be employed in the present invention.

As mentioned, the polymers of the present invention are prepared by dissolving a hydrocarbon polymer in an inert reaction medium. By "inert reaction medium" is meant a solvent or diluent which is so inert under the reaction conditions that it will not adversely affect the course of the reaction or the reaction products. Specific examples of reaction media operable in the present invention include aromatic hydrocarbons such as benzene and chlorinated benzenes; and chlorinated hydrocarbons such as carbon tetrachloride, chloroform, chlorobenzene, perchloroethylene and ethylene dichloride. The amount of reaction medium used in the present invention will vary depending upon the particular medium employed and the molecular weight of the hydrocarbon polymer. Generally, however, the concentration of polymer in solvent will be from 1 percent to 50 percent by weight solids, preferably from 1 percent to 25 percent by weight solids.

The chloronitrosylation reaction of the present invention is generally carried out at a temperature between −30° C. and 125° C., preferably between 25° C. and 100° C. The particular temperature will depend upon the hydrocarbon polymer, the inert reaction medium, and the initiator as well as other reaction conditions such as time and pressure employed. It is preferred to carry out the reaction under reflux conditions. The reaction may be carried out at atmospheric, superatmospheric or subatmospheric pressure. The time of the reaction will vary with the reactants employed and the temperature of the reaction. Generally, however, from 1 hour to 60 hours, preferably from 1 hour to 24 hours, will be sufficient to insure that the reaction has occurred.

The modified polymer is isolated, for example, by cooling the reaction mass to room temperature or lower, then adding the cold reaction mixture to an organic solvent such as an alcohol until the modified polymer precipitates from solution. The precipitated polymer is then separated from the liquid phase by any suitable means, e.g., by filtration or decantation.

The chloronitrosylated polymers of the present invention may be cured by heating to a temperature of from 75° C. to 225° C. Pressure may accompany the cure of the polymers. Generally, the cure is carried out in the presence of a filler such as carbon black and magnesium oxide and other basic oxides such as zinc, lead or calcium oxides. The cured polymers exhibit increased tensile strength, decreased elongation and insolubility in organic solvents.

The following examples illustrate the invention. All parts are by weight unless otherwise indicated. In the examples which follow, the percent chlorine was determined by the Mohr Chlorine Procedure and the percent nitrogen was determined by the Dumas Nitrogen Procedure. The physical properties of the cured polymer were determined according to standard ASTM procedures.

EXAMPLE I

A reaction vessel equipped with a thermometer, stirrer, condenser, and heat exchange means was charged with 1,000 parts of carbon tetrachloride and 50 parts of polyethylene having a molecular weight of about 60,000, a melt index of 20 and a density of 0.915. The charge was heated to 70°–75° C. and 12 parts of nitrosyl chloride was slowly introduced into the charge in the presence of three-300 watt sunlamps. The reaction was allowed to continue for 48 hours at which time the reaction mixture was cooled to room temperature. The product was precipitated out of solution by adding isopropanol to the reaction mixture. Analysis of the product indicated that the product contained 2.33 percent nitrogen by Dumas and 8.37 percent chlorine with a 1.48 mole ratio of chlorine to nitrogen.

The polymer prepared above was cured by heating to 300°F. for 20 minutes in the presence of a magnesium oxide filler (10 percent by weight of the polymer). The cured polymer exhibited the following physical properties:

| | |
|---|---|
| Tensile Strength, psi | 1540 |
| 300% Modulus | 1320 |
| 100% Modulus | 1008 |
| Elongation, % | 355 |
| Shore A Hardness | 81 |

EXAMPLE II

A reaction vessel equipped as described in Example I was charged with 400 parts of benzene and 40 parts of chlorinated polyethylene having a molecular weight of approximately 20,000, a chlorine content of 36 percent and a bulk density of 28 pounds per cubic foot. The charge was heated to 60°–80° C. and 12 parts of nitrosyl chloride was slowly introduced into the charge in the presence of ultraviolet light. The reaction was carried out for 3.5 hours at 75° C. to 80° C. The product was isolated by stripping the benzene from the reaction mixture under vacuum. Analysis of the product indicated that it contained 0.9 percent nitrogen and 33.3 percent chlorine.

The polymer prepared above was cured by heating to 300° F. for 10 minutes in the presence of a magnesium oxide filler (10 percent by weight of the polymer). Physical properties of the cured polymer are presented below:

| | |
|---|---|
| Tensile Strength, psi | 2394 |
| 300% Modulus | 1708 |
| 100% Modulus | 467 |
| Elongation, % | 342 |

EXAMPLE III

A reaction vessel as described in Example I was charged with 1,585 parts of carbon tetrachloride and 100 parts of butyl rubber having a molecular weight of about 500,000. The charge was heated to 78° C. and two parts of chlorine in 80 parts of carbon tetrachloride and three parts of nitrosyl chloride were added thereto in the presence of ultraviolet light for 10 minutes. The product was isolated by evaporation of the carbon tetrachloride at 100° C. under reduced pressure. Analysis of the product indicated that it contained 0.7 percent nitrogen and 5 percent chlorine.

The above product was cured by treating 80 parts of the product with 40 parts of carbon black filler, 8 parts of zinc oxide, 1 part stearic acid and 0.25 part phenyl β-naphthylamine in a mold at 300° F. and under 5,000 psi pressure for 30 minutes. The physical properties of the cured polymer are presented below:

| | |
|---|---|
| Tensile Strength, psi | 483 |
| 300% Modulus | 461 |
| 100% Modulus | 258 |
| Elongation, % | 397 |

EXAMPLE IV

A reaction vessel equipped as described in Example I was charged with 396 parts of carbon tetrachloride, 75 parts of chloroform, and 30 parts of polyvinylfluoride having a molecular weight of approximately 100,000, a melting point of 195° C. to 205° C., a density of 1.4 grams per milliliter, and a refractive index of 1.45. The charge was heated to 60°–78° C. and 9 parts of nitrosyl chloride was slowly introduced into the charge in the presence of ultraviolet light for 3 hours. The resulting product was isolated from the reaction mixture by stripping the solvents therefrom under vacuum. Analysis of the product indicated that it contained 0.4 percent nitrogen and 1.28 percent chlorine.

Films prepared at 390° F. for 5 minutes had a tensile strength of 7,000 psi compared to 5,000 psi for an untreated polyvinylfluoride film. Polyvinylfluoride dissolved in boiling dimethylformamide, while the cured chloronitrosylated film showed only slight swelling under the same conditions.

EXAMPLE V

A reaction vessel equipped as described in Example I was charged with 396 parts of carbon tetrachloride, 75 parts of chloroform, and 30 parts of polyvinylchloride having a molecular weight of approximately 100,000, a chlorine content of 56 percent, specific gravity of 1.4, and an inherent viscosity of 0.69. The charge was heated to 78° C. and 9 parts of nitrosyl chloride was introduced into the charge in the presence of ultraviolet light over a 2½ hour period. The resulting product was isolated from the reaction mixture by stripping all volatiles under reduced pressure. Analysis indicated the product contained 60.13 percent chlorine and 0.45 percent nitrogen.

EXAMPLE VI

A reaction vessel equipped as described in Example I was charged with 220 parts of benzene and 30 parts of polystyrene having a molecular weight of about 200,000, and specific gravity of 1.05. The charge was heated to 80° C. and 8.5 parts of nitrosyl chloride was introduced into the charge in the presence of ultraviolet light over a 3 hour period. The resulting product was isolated from the reaction mixture by stripping all volatiles under reduced pressure. Analysis of the product indicated that it contained 1.84 percent chlorine and 0.65 percent nitrogen.

EXAMPLE VII

A reaction vessel equipped as described in Example I was charged with 50 parts of the polyethylene described in Example I, 0.6 parts of benzoylperoxide, 25 parts of carbon tetrachloride, and 9 parts of nitrosyl chloride. The charge was heated to 100° C. and maintained at this temperature for 9 hours. At this point, the volatiles were stripped from the reaction mixture under reduced pressure. The resulting product had a melting point of 100° C. to 106° C., a molecular weight of 1,565, a density of 0.9515, a chlorine content of 7.1 percent and a nitrogen content of 1.0 percent.

EXAMPLE VIII

The previous example was duplicated with the single exception that azobis(isobutyronitrile) was substituted for benzoylperoxide. The resulting product had a molecular weight of 1,365, a density of 0.9515, a chlorine content of 6.03 percent and a nitrogen content of 1.0 percent.

What is claimed is:

1. A process for the chloronitrosylation of a polymer selected from the group consisting of polyolefins, chlorinated polyolefins, polystyrenes and polyvinyl halides which comprises contacting in the presence of a catalyst said polymer with nitrosyl chloride or chlorine and nitric oxide in the presence of a solvent.

2. The process of claim 1 wherein the solvent is selected from the group consisting of carbon tetrachloride, benzene, chloroform and mixtures thereof.

3. The process of claim 1 wherein the catalyst is light.

4. The process of claim 1 wherein the catalyst is a free-radical catalyst.

5. The process of claim 1 wherein the polymer is a polyolefin.

6. The process of claim 1 wherein the polymer is polyethylene.

7. A process for the chloronitrosylation of polyethylene which comprises dissolving said polyethylene in a solvent and reacting said polyethylene with nitrosyl chloride in the presence of light.

8. A chloronitrosylated polymer selected from the group consisting of polyolefins, chlorinated polyolefins, polystyrenes and polyvinyl halides, said chloronitrosylated polymer having a chlorine content of from 0.05 percent to 83 percent by weight, a nitrogen content of from 0.1 percent to 5 percent by weight, and prepared by contacting in the presence of a catalyst said polymer with nitrosyl chloride or chlorine and nitric oxide in the presence of a solvent.

9. A cross-linked chloronitrosylated polymer obtained by heating to a temperature of from 75° C. to 225° C. the chloronitrosylated polymer of claim 8.

10. The polymer of claim 9 when heating is carried out in the presence of a filler.

* * * * *